United States Patent [19]
Wright

[11] 3,902,574
[45] Sept. 2, 1975

[54] EMERGENCY BRAKE FOR TRUCKS, TRAILERS, AND BUSES

[76] Inventor: Charles A. Wright, 97 Hilda St., Pittsburgh, Pa. 15235

[22] Filed: Feb. 20, 1974

[21] Appl. No.: 444,238

[52] U.S. Cl. ................................ 188/4; 188/36
[51] Int. Cl.² ........................................ B60T 1/04
[58] Field of Search .......................... 188/4, 5, 36

[56] References Cited
UNITED STATES PATENTS

| | | | |
|---|---|---|---|
| 2,730,196 | 1/1956 | Besoyan | 188/4 R |
| 2,789,665 | 4/1957 | Wright | 188/4 R |
| 3,176,798 | 4/1965 | Nesselberger | 188/4 R |
| 3,321,046 | 5/1967 | Cooper | 188/4 R |

FOREIGN PATENTS OR APPLICATIONS

| | | | |
|---|---|---|---|
| 238,311 | 8/1925 | United Kingdom | 188/4 R |
| 481,766 | 6/1953 | Italy | 188/4 R |

*Primary Examiner*—George E. A. Halvosa

[57] ABSTRACT

An emergency brake system for wheeled vehicles characterized by vertical drive mechanism mounted in front of a wheel of a vehicle, a frame movable vertically on guide arms from a retracted position above a wheel travel surface to an extended position on the travel surface, and a wheel chock slidably mounted on the frame for movement vertically therewith and horizontally thereon. The frame comprises vertical members and horizontal arms with the vertical members engaging the vertical guide members and the horizontal arms supporting the chock. The chock includes horizontal slots in which the horizontal arms are disposed, and a releasable latch for normally holding the frame and chock in the retracted position.

6 Claims, 8 Drawing Figures

PATENTED SEP 2 1975          3,902,574

PATENTED SEP 2 1975    3,902,574

EMERGENCY BRAKE FOR TRUCKS, TRAILERS, AND BUSES

BACKGROUND OF THE INVENTION

1. Field of the Invention:

This invention relates to an emergency braking system and more particularly to a positive and reliable emergency brake adapted for use on trucks, trailer trucks, buses, and the like.

2. Description of the Prior Art:

The emergency brake system of this invention is related to that disclosed in patent No. 2,789,665 of William Wright. More particularly, however, the braking system of this invention provides positive tracking means for maintaining the wheel chocks upright on their support frames and thereby effecting a more positive braking action between the chocks and the wheels of a moving vehicle. Associated with the foregoing is the provision of a stopping surface under the chock which surface enables the chock to slide briefly on a road surface during initial engagement of the wheels with the chock in order to avoid excessive vibrations between the wheels and the vehicle which would otherwise occur.

SUMMARY OF THE INVENTION

Generally, it has been found that an improved emergency braking system may be provided for wheeled vehicles such as trailers, trailer trucks, and buses, which braking system comprises vertical guide rods fixedly mounted in front of the rear wheels of a vehicle, a frame comprising the vertical and horizontal members, the vertical members being mounted on the guide rods and movable vertically on the rods from a retracted position above the wheel travel surface to a position in contact with the travel surface, wheel chocks slidably mounted on the horizontal members between the retracted end wheel engaging positions, each chock comprising opening means through which the horizontal bars extend and by which the chock is maintained upright, releasable latch means on the vertical guide rods for normally holding the frame and chock in the retracted position, whereby the chock engages the travel surface and moves horizontally beneath the wheel of the vehicle.

The advantage of the device of this invention is that it provides for a greatly increased margin of safety for larger motor vehicles and greatly minimizes the incidents of accidents which would otherwise occur. The device of this invention is particularly suitable for use on buses, to reduce collisions and other types of accidents which would otherwise occur and endanger the lives of passengers on a bus.

DESCRIPTION OF THE PREFERRED EMBODIMENT

Figure 1:
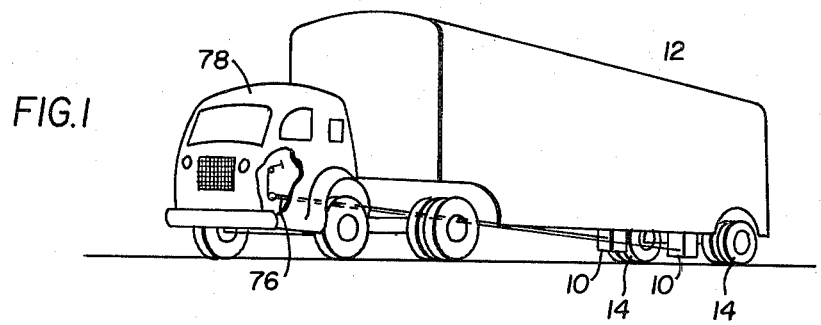
FIG. 1 is an isometric view, partly cut away, of a tractor and semi-trailer incorporating the emergency brake system of this invention.

In FIG. 1, a box-like housing 10 is mounted on the frame of a semi-trailer 12 in front of trailer wheels 14. The box-like housing 10 has a rectangular configuration composed of spaced side and end walls, the upper ends of which are attached to the frame of the semi-trailer or rig 12, the housing is shown in broken line position only in FIG. 3 for simplicity of description.

Figure 8:
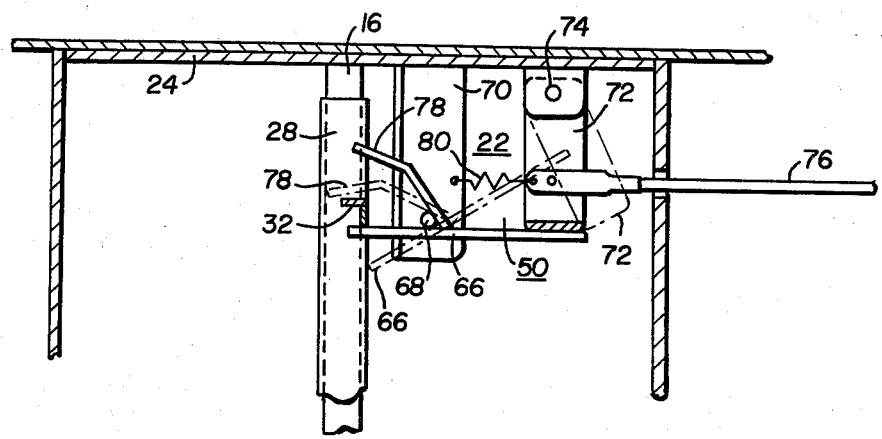
FIG. 8 is a fragmentary elevational view showing the latching mechanism.

The braking system comprises a pair of vertical guide means or guide rods 16, frame means generally indicated at 18 (FIG. 4), a chock 20, and releasable latch means generally indicated at 22 in FIG. 8. As shown more particularly in FIG. 5, the pair of guide rods 16 extend vertically from a mounting plate 24 to which the rods are attached in a suitable manner such as by welding to the plate. The plate 24 in turn is secured to the frame of the rig, 12 in a suitable manner such as by bolting or welding (not shown). The lower ends of the guide rods 16 are spaced from a wheel travel surface or road surface 26. The guide rods 16 are preferably solid and, as shown, in the drawings are disposed ahead of the trailer wheels 14.

Figure 2:
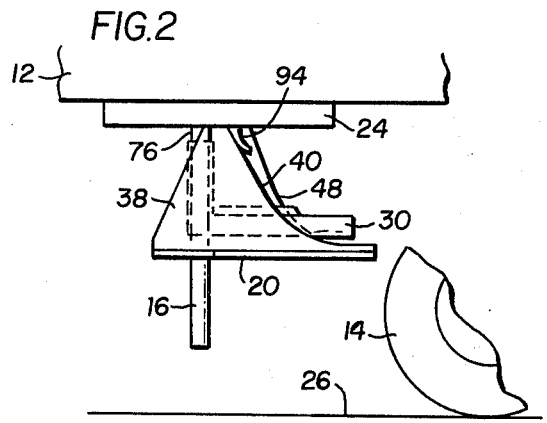
FIG. 2 is a side elevational view of a wheel chock in the retracted position.
Figure 3:
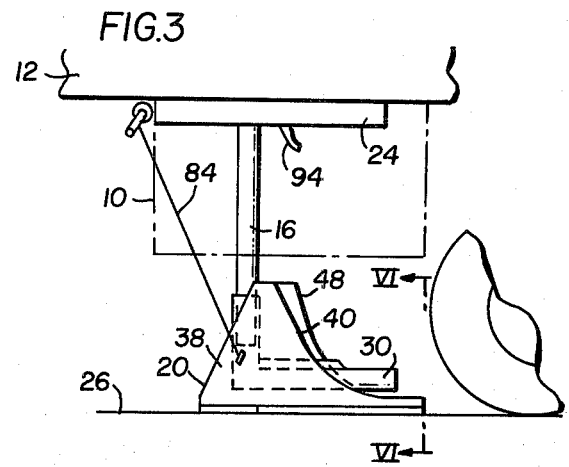
FIG. 3 is a side elevational view of the wheel chock in the lowered position.

The frame means 18 is an L-shaped member comprising a pair of vertical guide means or tubes 28 and horizontal guide means or arms 30. The tubes 28 are telescopically mounted on the guide rods 16 and slidably disposed thereon to enable movement of the chock 20 between the retracted position (FIg. 2) and the lower position in contact with the road surface 26 (FIG. 3). As shown in FIG. 2, when the chock 20 is in a retracted position, the lower end portions of the guide rods 16 extend below the lower ends of the tubes 28. A connecting link 32 extends between the upper end portions of the tubes 28 to which the link is secured in a suitable manner such as by welding. The link 32 serves the dual purpose of reinforcing the tubes 28 as well as providing latching means as described below.

The arms 30 extend horizontally from the lower ends of corresponding tubes 28; that is, rearwardly from the tubes and toward the wheels 14. The arms 30 provide the primary guide means for the chock 20 as well as maintain support thereof in the retracted position.

The chock 20, of which there are preferably two for each pair of trailer rear wheels 14, is a box-like member which is slidably mounted on the arms 30. Each chock 20 comprises a bottom plate 34, oppositely disposed side plates 36 and 38, an arcuate plate 40, and a reinforcing cross plate 42. In addition, the chock 20 comprises mounting means including opening means for slots 44 and 46.

The arcuate plate 40 engages the tires 14 and where dual wheels 14 are provided, a divider 48 is preferably disposed on the arcuate plate centrally between opposite side plates 36, 38, which divider extends between the separation between the tires of a dual wheel vehicle. When an emergency stop situation occurs, a latch generally indicated at 50 is actuated to release the chock 20 from the retracted position (FIG. 2), whereupon it drops to the road surface 26 (FIG. 3) and then slides rearwardly on the arms 30 until the wheels 14 engage the rear edge and roll onto the arcuate plate 40 to the position shown in FIG. 4.

Figure 7:
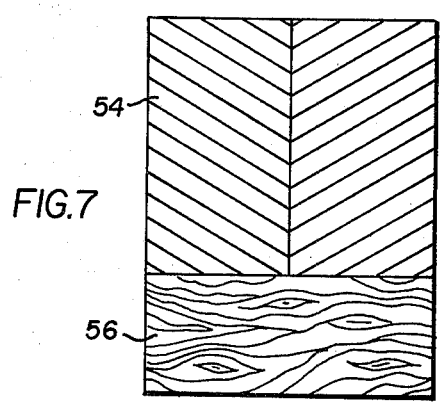
FIG. 7 is a bottom plan view taken on the line VII—VII of FIG. 6.

With the wheels 14 no longer in rolling position, the chocks 20 slide upon the road surface 26 and gradually reduce the momentum of the rig 12 and bring it to a halt. For that purpose, a friction plate or shoe 54 is attached to the undersurface of the bottom plate 34 and is preferably composed of a friction-inducing material such as rubber. In addition, the rear end portion 56 (FIG. 7) of the bottom plate 34 is preferably covered with a material, such as oak wood, having less friction-inducing or partial sliding characteristics than rubber.

The rear portion 56 has the primary purpose of avoiding the detrimental effects of misalignment of the chocks 20 with the wheels 14 as the wheels initially roll onto the arcuate plate 40. Thus, in the initial stage, the chocks slide on the road surface 26 under the weight of the wheels 14 and provide a more gradual stopping surface than would otherwise occur if the entire undersurface of the bottom plate 34 were covered with rubber. It is understood that any other configuration or proportion of the shoe 54 and the rear portion 56 is possible.

Figure 6:
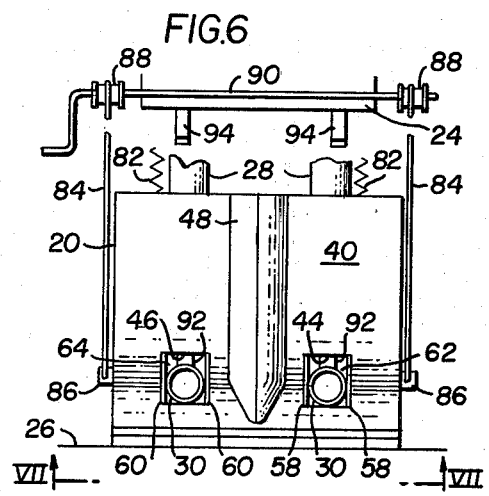
FIG. 6 is an enlarged elevational view of the chock taken on the line VI—VI of FIG. 3.
Figure 5:
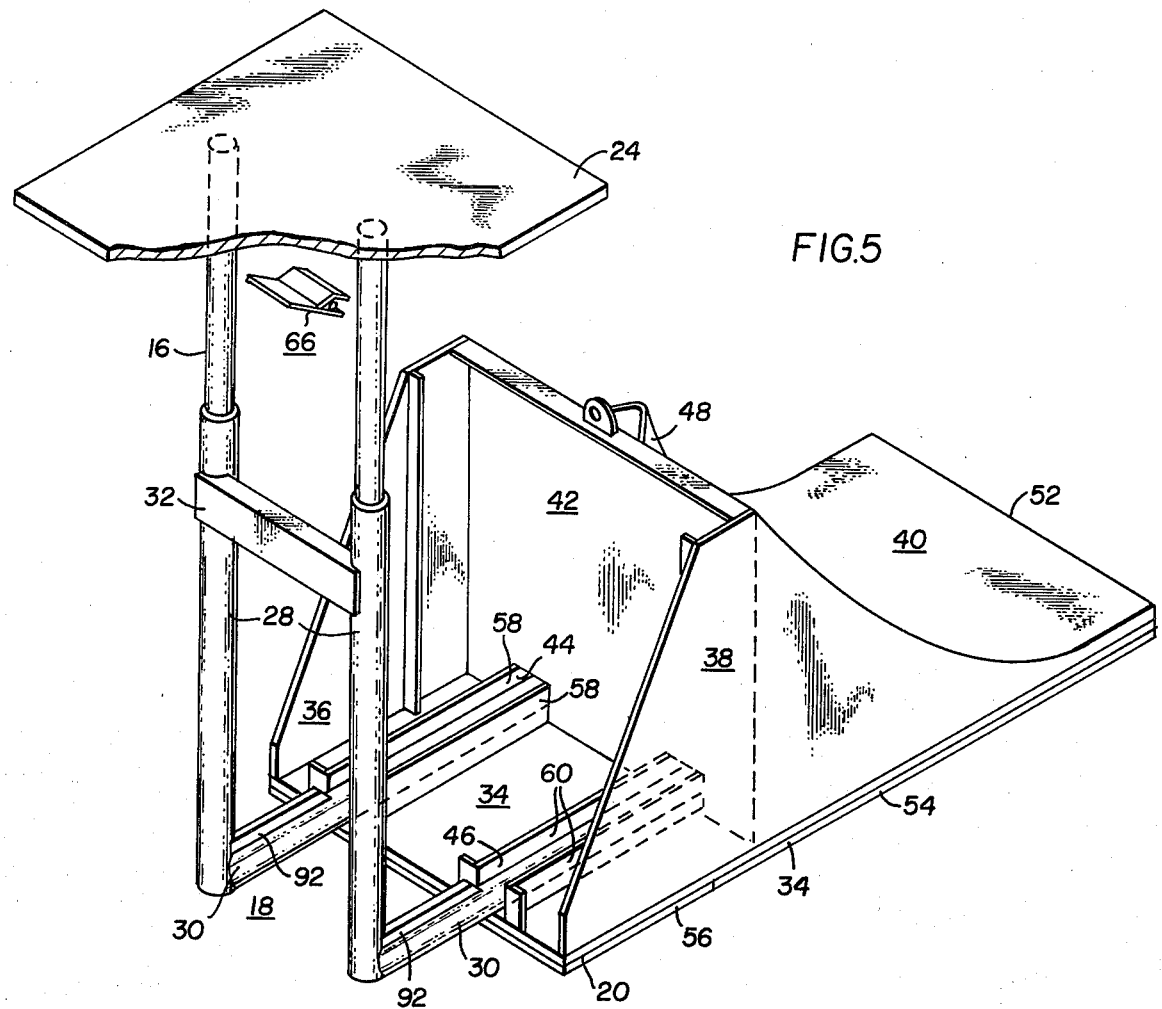
FIG. 5 is an enlarged isometric view of the wheel chock in the braking position as shown in FIG. 4.

As shown in FIG. 5, the slots 44, 46 extend from the forward end (adjacent the tubes 28) to the arcuate plate 40 (FIG. 6). Thus, in the position of chock shown in FIG. 3, the arms 30 extend beyond the plate 40 so that the tubes 28 are adjacent to the cross plate 42 in the retracted position which position is proximate to the center of gravity of the chock 20. As shown in FIG. 5, the slots 44 and 46 are disposed between spaced pairs of vertical side plates 58 and 60, respectively, which plates are secured to the upper surface of the bottom plate 34 in a suitable manner such as welding. The side plates 58 and 60 extend through the chock and terminate at the arcuate plate 40. Thus, the side plates 58, 60 provide a continuous opening means or slots 44 and 46 in which the arms 30 are slidably disposed. The slots 44, 46 terminates at similar holes 62, 64 in the arcuate plate 40 (FIG. 6).

As shown in FIG. 8, the releasable latch means 22 comprises a latch lever 66 which is pivotally mounted on a pivot shaft 68 extending between spaced pairs of support members 70 extending from the plate 24. A left end portion (FIG. 8) of the lever 66 is engaged under the connecting link 32 when the frame means 18 is in the retracted position. To relelase the latch a trip lever 72 is rotated about its pivot pin 74 to the broken line position thereof, whereupon the weight of the frame means 18 applied on the link 32 causes the latch lever 66 to rotate counterclockwise about the pin 68 to the broken line position 66. Rotation of the trip lever 72 is caused by a rod 76 which extends from the lever to a convenient location in the cab 78 (FIG. 1) of the rig 12. In addition, the lever 66 includes a relatch member 78 which in the unlatched broken line position (FIG. 8) extends into the path of movement of the link when the frame means 18 is returned to the retracted position, thereby rotating the latch lever 66 to the latched position. A retracting spring 80 is attached to the end of the rod 76 as shown, or other suitable retraction means may be provided along the cable at any other location, such as in the cab 78.

Figure 4:
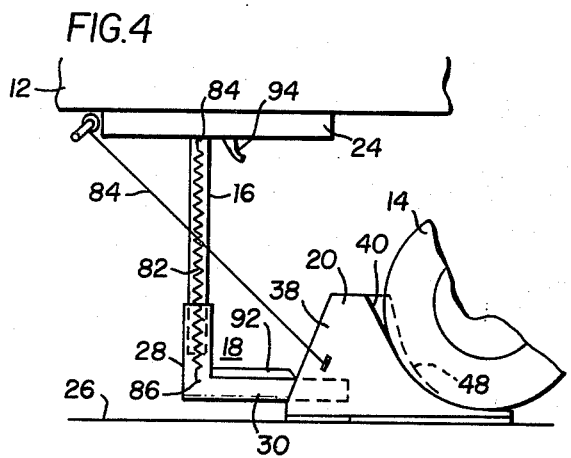
FIG. 4 is the side elevational view of the wheel chock in the braking position.

The frame means 18 is provided with suitable counterbalancing means such as a pair of tension springs 82 (FIGS. 4 and 6). The upper ends of the springs 82 are attached to the guide rods 16 at 84 near the mounting plate 24 and the lower ends of the spring are attached to the corresponding tubes 28 at 86 (FIG. 4). Accordingly, when the latch means 22 is released, the chocks 20 are under the counterbalancing effect of the springs 82 and are more easily raised to the retracted position as set forth below.

When the emergency brake system is used to bring the rig 12 to a halt, the chocks 20 must be returned to the retracted position (FIG. 2) before the vehicle can again travel forward. For that purpose, the rig is backed off of the chocks and the chocks 20 remain on the road surface 26 while the arms 30 slide through the slots 44 and 46 until the tubes 28 are proximate to the cross plate 42. The condition of the chocks 20 is that shown in FIG. 3. The assembly of the chocks 20 and the frame means 18 may be raised from the position of FIG. 3 to that shown in FIG. 2 by either manually lifting the assembly until the latch lever 66 engages the link 32, or by semiautomatic means. The semiautomatic means may include a pair of cables 84 (FIGS. 3, 4 and 6) which extend from ears 86 (FIG. 6) on side plates 36 and 38 to corresponding winches 88 on the crank shaft 90 (FIG. 6). Manifestly, rotation of the crank shaft 90 raises the chocks 20 to the retracted position of FIG. 2.

In order to enable sliding of the chocks 20 from the position of FIG. 3 to that of FIG. 4, the slots 44, 46 and the holes 62, 64 are slightly greater than the diameters of the arms 30, whereby any binding between the arms and the side walls 58 and 60 is minimized.

When the chocks 20 are in the retracted position, of FIG. 2, it is desirable to minimize unnecessary noise during travel, such as rattling between the arm 30 and the chocks 20. For that purpose, the ends of the arms 30 adjacent the tubes 28 are enlarged such as by providing space filler bars or fins 92 which engage the upper sides of the holes 62, 64 as well as the corresponding holes in the cross plate 42. In addition, a pair of keepers or horns 94 (FIGS. 3 and 6) extend downwardly from the mounting plate 24 for the purpose of contacting the arcuate plate 40 when the chock 20 is retracted (FIG. 2). The horns 94 are spaced from the guide rods 16 by a distance substantially equal to the distance from the cross plate 42 and the arcuate plate so that when the chocks 20 are retracted, they are retained snugly between the horns and the guide rods 16, whereby rattling noises are substantially eliminated. As shown in FIG. 2, the shape of the horns 94 is arcuate and corresponds to the shape of the arcuate plate 40 at its upper end. Thus, the chocks 20 are held more securely in the retracted position with a minimum of noise due to vibration.

Accordingly, the device of the present invention is dependent upon an operator's initiative (rather than automatically) and satisfies a need for the protection of lives and property and therefore greatly increases safety on the roads and highways.

What is claimed is:

1. An emergency braking system for wheeled vehicles comprising vertically extending guide means fixedly mounted in front of a wheel of a vehicle, frame means movable vertically on said guide means from a retracted position above a wheel travel surface to a position adjacent the travel surface and disengaged of the wheel, the frame means comprising vertical means mounted on the vertical guide means and at least two horizontal arms extending from the vertical means toward the wheel, a wheel chock having an arm-receiving opening for each arm and mounted on the horizontal arms, the horizontal arms being slidable in the openings between the disengaged and engaged positions of the wheel, the arms being disposed in the openings in all positions of the chock, latch means on the vertically extending guide means for mormally holding the frame means and chock in the retracted position, whereby the chock engages the travel surface and moves horizontally beneath the wheel of the vehicle upon latch release.

2. The braking system of claim 1 in which the openings extend through the chock.

3. The braking system of claim 1 in which each opening comprises spaced vertical side walls to maintain alignment of the chock with the spaced arms.

4. The braking system of claim 1 in which the chock comprises a bottom surface engageable with a wheel travel surface and having at least a portion of the surface covered with a friction-inducing material.

5. The braking system of claim 4 in which said surface portion is covered with rubber.

6. The braking system of claim 4 in which another surface portion is slidable on the travel surface.

* * * * *